3,299,354
APERTURE TUBE STRUCTURE FOR PARTICLE STUDY APPARATUS

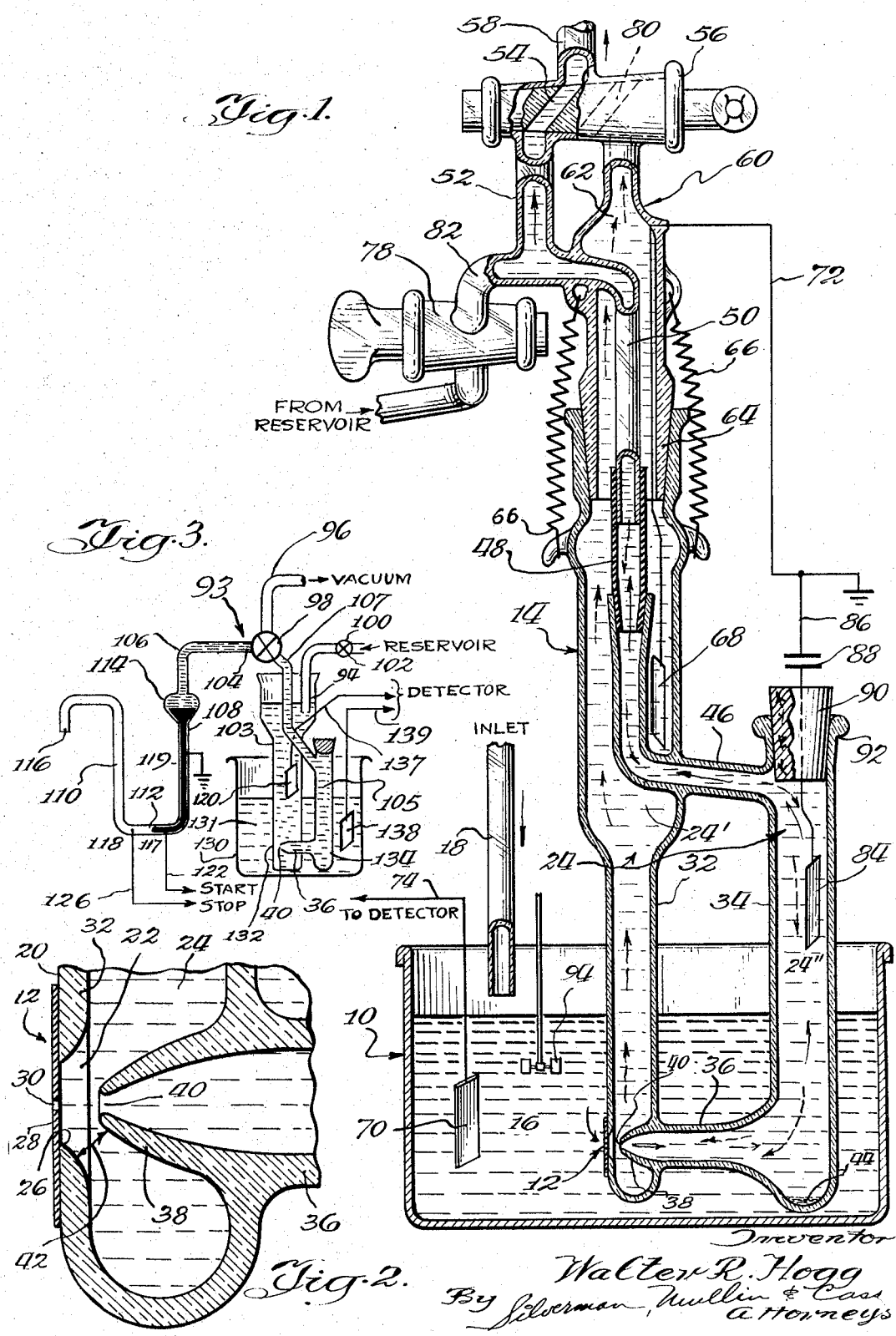

Walter R. Hogg, Miami Springs, Fla., assignor to Coulter Electronics, Inc., Hialeah, Fla., a corporation of Illinois
Filed July 5, 1962, Ser. No. 207,582
3 Claims. (Cl. 324—71)

This invention relates generally to the art of studying the physical properties of particles carried in suspension and more particularly is concerned with apparatus for obtaining signals from particles passing through a scanning aperture without extraneous interference from other particles.

Particles of microscopic and even sub-microscopic size are counted and sized throughout the world through the use of apparatus known as the Coulter electronic counting device. This device is constructed in accordance with the principles of U.S. Patent 2,656,508 in which there are a pair of vessels of insulating material having a minute aperture between them. A suspension of the particles desired to be studied is flowed from one vessel to the other through the aperture. An electrical current is established through the aperture through the use of suitable electrodes suspended in the respective bodies of liquid in the vessels and a source connected across the electrodes. The displacement of fluid subtended within the aperture by the presence of a particle will cause a change in the impedance of the aperture, and this change is detected by suitable detecting means connected across the aperture, that is between the electrodes.

The particles can be counted by electronically and/or mechanically counting the number of changes of impedance. The particles can be sized by using suitable thresholds or gates in the detecting device, since the change which occurs in the impedance of the aperture is for most purposes almost directly related in amplitude to the volume of the particle.

In carrying out the counting and/or sizing of particles with the prior art devices, structure has been used for metering a known quantity of suspension flowing through the aperture or scanning element, as it has sometimes been known. Such structure has been described and claimed in U.S. Patent 2,869,078 and is also in wide use throughout the world.

The structure of Patent 2,869,078 utilizes a manometer-siphon arrangement to suck the suspension from the one vessel through the aperture to the other. The manometer uses a mercury column normally opening to the atmosphere which is unbalanced by a source of vacuum that is in communication with the second of the above-mentioned vessels. The column is passed through a short metering section whose volume is known, and a pair of contacts is provided at the beginning and end of the metering section. After the mercury column is permitted to recede to balance, it passes through the metering section while sucking the suspension through the scanning element. The first contact engaged by the column will turn the detecting device on, and the second contact will turn it off.

This completes one apparatus run, and, thereafter, the vacuum is applied to once more unbalance the column and another run is made. This continues as long as desired.

It will be appreciated that the description above relates to a plurality of consecutive determinations. This is the technique best suited for counting and sizing where particles being studied are blood cells and similar relatively light weight particles, or where batch methods are preferred. The first vessel can be removed and replaced by other samples readily.

In cases where flow-through systems are used, the manometer-siphon normally will not be used.

In appreciating the impact of the invention herein, it would be well to point out that the influence which is felt upon the system by the passage of a particle is due to the displacement of the liquid in the aperture under conditions in which the density of the current flowing between the electrodes in the respective vessels is greatest. Far outside of the aperture the current density is very much less than within the aperture, and the influence of passing particles is so insignificant, or at least so much less than the effect of particles passing through the aperture, that it is not considered.

It will be appreciated that the current density in the suspension in the immediate vicinity of the aperture will be higher than the current density a few millimeters away from the aperture. As a matter of fact, it is most difficult to devise an aperture such that there is an abrupt change of current density at the downstream end of the aperture. The normal aperture construction is formed by making a large hole in the wall of a tube and then fusing a wafer over the hole. This results in a relatively larger bore passageway downstream of the wafer, which while it is large enough not to influence most determinations, nevertheless can be a source of difficulty in certain instances.

Where particles have been passed through the scanning element and already produced the desired signal due to such passage, it has occurred that such particles will float or whirl into the immediate vicinity of the downstream end of the aperture and cause another signal to occur due to passage into an area of relatively high current density. This gives rise to spurious readings and counts.

Without further consideration, it may be stated that the primary object of the invention is to provide a structure which will substantially decrease, if not eliminate, the possibilities of such spurious signals occurring.

The occurrence of spurious signals may be due to several factors. It is especially likely to occur in particle study apparatus which has been designed to provide information relating to particles of widely divergent sizes. Where the particles are all of substantially the same size, and/or the gates or thresholds are arranged to count or record the passage of particles of substantially the same size, the problem usually will not arise. Batch apparatus normally will be flushed often, so that sedimentation will not be very disadvantageous. Flow-through apparatus, that is, a system in which there is a continuous flow of the suspension through the aperture, may have a tendency to collect a fairly large deposit of particles at the bottom of the tube carrying the scanning element. Swirling or turbulence or floating may cause some of these sediment particles to move into the immediate vicinity of the aperture and thus produce signals of low amplitude. The detector then reads such a signal as an additional particle of smaller size.

It might be stated that the presence of spurious signals can be, and originally was detected by passing a suspension of particles known to be of a certain uniform size through an apparatus which is arranged to respond to a wide range of sizes of particles.

As indicated above, it is believed that the movement of particles on the inside of the aperture, that is, downstream thereof, is caused by the creation of a vortex just inside of the wafer swirling the particles inside of this portion. This region constitutes part of the so-called "critical volume" of the aperture, and the invention provides structure which obviates the return movement of particles into this "critical volume."

An important object of the invention, therefore, is to provide a structure for the practice of the known particle analyzing method in which the so-called aperture tube is replaced by a pair of chambers having an interconnection for separating the electrical and mechanical effects of the particles passing through the aperture.

A further object of the invention is to provide a structure in which particles which once pass through the aperture of the apparatus will immediately be transported away from the immediate vicinity of the aperture so that there will be little or no chance of spurious signals resulting from said particles.

A further object of the invention is to provide novel structure for filling the chambers of the aperture apparatus.

Another important object of the invention is to provide an aperture tube for use with prior art apparatus which is self-cleaning in that the suspension in the immediates vicinity of the aperture is kept free of extraneous particles.

Many other objects and advantages of the invention will occur to those skilled in this art as a description of the invention proceeds in connection with which preferred embodiments are illustrated in the accompanying drawing and set forth in considerable detail in the accompanying specification.

In the said drawing:

FIG. 1 is a sectional view through apparatus constructed in accordance with the invention, including some diagrammatic representation for the purpose of explaining the same.

FIG. 2 is a fragmentary enlarged sectional view through the apparatus in the vicinity of the aperture to show the details thereof.

FIG. 3 is a diagrammatic view of a device operating in connection with a manometer-syphon having the invention associated therewith.

Generally the invention is associated with the prior art Coulter apparatus in substitution of the portion of the Coulter apparatus which is known as the aperture tube. The usual aperture tube consists of an elongate tube having a flattened wall with a small hole formed therein and a thin wafer having a very fine aperture is secured over the hole. The tube carries an electrode and its upper end connects through at least two branches to a source of vacuum and the siphon-manometer. The tube is immersed in a sample suspension, usually held in a beaker, and the procedure followed above is used to obtain the desired signals. The electrical current passes through the tube as does the suspension. Sediment usually drops to the bottom of the tube where it remains until flushed out from time to time.

The present invention is characterized by providing a two-chamber aperture tube, one of which chambers has substantially stagnant liquid or electrolyte therein, and the other of which has the suspension flowing through the same. The entrance to the second chamber is by way of a nozzle or neck that has an inlet port of fine dimension aligned with the aperture but spaced therefrom by a small volume of liquid. The only opening between the two chambers is by way of the inlet port. The nozzle or neck draws the stream of particles passing through the aperture into the second chamber so that the first chamber will have substantially no particles therein, and no unidirectional liquid movement. The electrical connection to the electrode is provided in the first chamber so that no signals will be produced by the particles moving into or through or within the second chamber.

A special stop-cock arrangement enables the chambers to be flushed or filled in a convenient and quick manner.

Referring now to the details of the drawing, reference first may be had to FIGS. 1 and 2 which may be assumed to illustrate a structure according to the invention, connected into prior art apparatus which is intended to handle a flow-through sample. This sample, it may be assumed, has a population of particles of divergent sizes and/or weights.

The particles being studied will flow from a first vessel 10 through what has heretofore been termed the aperture 12 to a second vessel 14. The first vessel 10 may be any type of container such as a beaker or the like and the suspension 16 therein forming a first body of fluid is supplied by any suitable conduit such as 18, it being recalled that the assumption is that this is in a flow-through system.

The aperture 12 is formed of several elements which are best shown in FIG. 2. In producing the aperture, the vessel 14 is first provided with a flattened surface 20 within which an opening is formed by usual glass-working techniques. Such opening usually is smaller at the outer surface of the vessel 14 and flares outwardly toward the inside of the wall in which it is formed. This produces a relatively large passageway 22 when compared with the smaller dimension of the aperture 12 which will presently be described. From the passageway 22, which will be called the secondary bore of the aperture, the aperture opens to the interior of the vessel 14, and the suspension passing through the aperture 12 will pass to a second body of fluid 24 on the interior of the vessel 14.

The opening of the flat surface 20 is shown at 26 and in the construction of the vessel 14 there is a thin wafer 28 of some inert material such as glass or corundum cemented or fused to the surface 20 with a central hole 30 coaxially aligned with the secondary bore 22. The hole 30 which is the critical orifice of the apparatus will hereinafter be called the primary bore of the aperture 12.

It is desired to point out that in this art, the word "aperture" has come to be used for designating the primary bore 30, and indeed, if it were practical to manufacture an aperture tube by simply drilling a fine hole in the side wall thereof of the desired dimensions, there would be no need for a separate wafer, there would be no secondary bore 22, and the description herein would need only refer to the aperture as the fine hole. Since this compound construction has some bearing on the problem solved by this invention, it is preferred to have the word "aperture" herein used as a generic expression including both the primary and secondary bores.

As thus far described, the structure is not much different from that which is already known. That which follows is directed to the changes occasioned by the invention herein.

The ordinary aperture tube as set forth in the earlier Coulter patents draws the suspension through the aperture into the interior of the tube where there is no control exerted upon the flow of the particles. In such case as explained, the particles which have already passed into the body of fluid 24 may whirl into the secondary bore 22 and perhaps during quiescent periods betwene the measurements even settle and perhaps accumulate on the ledge formed by its lower surface, concentrating the number of particles in the immediate vicinity of the critical volume and increasing the possibility of their being swirled back into it during the next measurement run.

The aperture tube 14 in one convenient practical embodiment of this invention is a multiple chamber vessel. It is formed of a central chamber 32 which may be of somewhat the same general configuration as the conventional aperture tube, and a second chamber 34 spaced from the first chamber but physically and fluidly connected therewith. The second chamber 34 may be termed the flow chamber because the principal flow of suspension through the aperture tube 14 will occur through this chamber. The first chamber 32 may be termed the stagnant chamber, because the suspension which is contained therein will, during normal use, remain therein without substantial change.

The flow chamber 34 is connected to the chamber 32 by means of an elongate neck 36, the tip 38 of which enters the side wall of the chamber 32 adjacent the bottom thereof and extends to a point directly opposite and aligned with the primary bore 30. At this point, the tip 38 is provided with a fine orifice 40, which, while it is very fine, nevertheless is substantially larger than the primary bore 30. In an actual structure, the diameter of the primary bore 30 was of the order of 200 microns or less (a micron is $1 \times 10^{-3}$ mm.) while the secondary bore ranged from a diameter of about 1½ mm. to about 3 mm. The diameter of the orifice 40 was of the order of 1 mm. while the distance between the tip 38 and the wall of the chamber 32 at the location designated 42 was of the order of 1 mm.

The path of flow of the suspension from the body of fluid 16 through the apparatus is as shown by the solid arrows. The suspension flows through the aperture 12 and shoots directly into the orifice 40 and into the neck 36. The body of suspension within the aperture tube 14 has been designated 24, but this includes the stagnant portion 24' in the chamber 32 and the flowing portion 24'' in the chamber 34. Thus, the suspension passes through the neck 36 which preferably flares outwardly as shown to prevent trapping of air bubbles, and passes into the vertical portion of the chamber 34. The heavier particles will drop to the sump 44 at the bottom of the chamber 34 but the lighter particles will be carried along through the conduit 46, the flexible coupling 48, the outlet conduit 50, up the branch 52 and by way of the passage 54 of the stop-cock 56 to the discharge conduit 58. This conduit may lead to a source of vacuum and suitable waste containers.

It will be seen from this description that it will be unusual for any particles to find their way into the interior of the chamber 32. At its upper end the chamber 32 is closed off by means of a fitting 60 which includes several components already mentioned, namely the outlet conduit 50, the stopcock 56 and connecting conduits. This fitting includes a connecting conduit 62 which leads directly from upper end of the chamber 32 to the stopcock 56, but in the condition that has been described wherein the suspension is flowing through the chamber 34, the conduit 62 is blocked and the body of fluid 24' is stagnant. The fitting 60 is held in place by means of a ground glass connection at 64 and springs 66 extending between suitable brackets or hooks on the respective parts.

The usual electrodes required to apply the aperture current across the primary bore 30 and to detect the particle producing signals are shown at 68 and 70. The electrode 68 is a platinum foil suspended in the body of fluid 24' and connected by way of the lead 72 through a wall of the fitting 60 to one terminal of the detecting device (not shown), normally that terminal which is at ground potential. The other electrode 70 is a similar foil member suspended in the vessel 10 and connected by lead 74 to the detector.

The other structure shown in FIG. 1 will shortly be described, but at this point it would be well to point out that the current conducting body of fluid is 24' and this is stagnant, while the body 24'' is the flowing body carrying the suspension through the vessel 14. Thus, no activities of the particles in the chamber 34 can have any influence upon the production of signals. Where in other prior art structures it was possible for particles to flow into the portion of the critical volume immediately downstream of the primary bore 30 and cause multiple signals which confused data obtained from the use of the apparatus, in the structure shown this is not possible. There will probably be eddy currents of fluid in the body 24' at the downstream end of the aperture 12 and no doubt these may swirl into the secondary bore, but the fluid will be the stagnant liquid devoid of particles and hence the only signals which are produced are those caused by the particles flowing through the primary bore 30.

The stopcock 56 is used in connection with a reservoir (not shown) and a second stopcock 78 to flush and fill the vessel 14. When it is desired to flush or fill the vessel 14, the stopcock 78 is opened (being normally closed during the actual run) and the stopcock 56 is rotated so that the passageway 54 is block and the passageway 80 is connected between the conduit 60 and the conduit 58. Liquid or electrolyte, without included particles, will be drawn from the reservoir through the stopcock 78 by way of the branch 82 through the outlet tube 50, coupling 48, the chamber 34 through the orifice 40 and up the chamber 32 and out through the conduit 62 to the waste container. The broken line arrows show this path. It will be seen the this is a simple arrangement, but quite effective to flush and fill the vessel and the chambers thereof.

It will be noted that there is an electrode 84 in the chamber 34 which is connected by the lead 86 through a condenser 88 to ground. The lead 88 may pass through the stopper 90 in the upper mouth 92 of the chamber 34. The purpose of this connection is to ground any pick-up of noise and hum by the connection of electrolyte outside of the shielding of the apparatus.

The suspension in the body of fluid 16 may be agitated to prevent sedimentation in the vessel 10 by means of any suitable mixer such as shown at 94.

Care should be taken in constructing the vessel 14 to prevent the presence of bubbles forming in the various passageways and conduits. This is done by suitable configurations of the parts. A likely source of trouble would be at the stopper 90, but this can be alleviated by suitable design.

The flow-through systems which utilize the invention to great advantage may consist of those involving both biological and industrial particles. In the case of biological particles, the electrolyte is usually a saline solution, but in the case of industrial particles, this may give way to solvents, oils and other fluids of relatively higher viscosity. One problem involves contaminants in hydraulic fluid, and the particles are quite varied in size and weight, and likely to be a source of spurious signals.

As stated above, the prior art apparatus has been used with means for metering a known quantity of suspension flowing through the aperture or scanning element. The structure of this invention relating to the aperture tube may be employed with equal effectiveness to such an application. FIG. 3 is an application of the invention to a structure which meters a quantity of suspension through the use of a manometer-syphon in a well known manner.

The metering device has been designated generally by the numeral 93. The aperture tube 94 of the device 93 is formed of chambers 103 and 105 and has an outlet 96 which is adapted to be connected to a vacuum source (not shown) through a threeway valve 98. The conduit 100 serves as an inlet to the device 93, and it includes a valve 102, for control purposes. The arm 104 is adapted to be connected to the second chamber 105 of the vessel or aperture tube 94 through the conduit 107. The branch arm 104 is integral with manometer arms 108 and 110. These arms and the manometer are of capillary tubing. The two vertical sections are joined by the horizontal connecting metering portion 112. Just below the bend 106 is a reservoir 114 for the mercury being carried in the capillary sections of the manometer. The free end 116 of the vertical section 110 opens to the atmosphere.

In the interior of the wall of the horizontal section 112 are a pair of electrical contacts 117 and 118 in spaced relation along said section which define between them a known volume in the tubular bore. An electrical contact 119 which is connected to ground is indicated at 120. The contact 117 is connected by lead 122 to means for initiating operation of the detector, and the contact 118 is connected by lead 126 to means for stopping the operation of the detector.

It should be pointed out that up to this point in the detailed description of the metering device it practically parallels the structure disclosed in U.S. Patent 2,869,078 and is being given consideration here in order to render a more complete understanding of the application of the invention. There is shown in FIG. 3 a first vessel 130, into which is charged the suspension 131 to be studied. It will be caused to flow through the aperture 132 into the second vessel 94. Upon application of vacuum at the outlet 96, and with the valve 98 connecting 104 with the outlet, the exertion of atmospheric pressure through the open end 116 will cause the mercury to be drawn into the reservoir 114 so as to withdraw the level in section 112 so that it is beyond the contact 117 and somewhat into the vertical section 108. No suspension will flow through the aperture 132.

Upon cessation of the air evacuation process the valve 98 is turned to connect 104 with 107. The mercury in the manometer will commence to seek a stabilized level and proceed to flow back into the section 112. As it passes over contact 117 it starts the counting device and at the same time the suspension is being sucked through the aperture 132 into the second chamber 105.

As the mercury column then passes contact 118 the counting is stopped. It will be appreciated, of course, that as the start contact is actuated the suspension that flows through the aperture carries particles with it. Passage of particles through aperture 132 will produce signals. These signals are detected through the electrode 136 which is connected to the detector by the wire 137, and an electrode 138 in fluid 131 is connected to the detector by lead 139.

The operation of the structure of FIG. 3 is quite similar to the operation of that of FIG. 1. Counting and/or sizing is performed with the structure of FIG. 3 only for the period during which the mercury is moving in the metering section 112 between electrodes 117 and 118. Furthermore, the external source of vacuum is not used during the measurement period.

Assume that the chambers 103 and 105 of the vessel 94 are empty. Clear electrolyte or solvent, devoid of particles is provided from the reservoir connected to the tube 100. Opening the reservoir valve 102 and moving the three-way valve 98 to connect 96 with 107 will connect the chamber 105 to the vacuum source to charge the entire vessel 94. Any suitable means is provided (not shown) to fill the manometer above the mercury to the valve 98. Thereafter the valve 102 is closed.

To make a determination, with valve 102 closed, the three-way valve 98 is opened between 96 and 94 until the mercury rises. Thereafter the valve is opened between the manometer conduit 104 and chamber 105 through 107. Suspension will be drawn through aperture 132 into the neck 36 by way of opening 40, just as in the case of FIG. 2. When the mercury turns the detector on and off the run is completed. Connecting the vacuum to the manometer raises the mercury, which again unbalances the system and the apparatus is ready for another run.

It is to be noted that during the determination, as in the case of the flow-through structure, the fluid in chamber 103 is stagnant, that is undisturbed. All of the flow of the suspension occurs in the other chamber 105. Also, the particles shoot into the neck and there is no likelihood of spurious signals.

The principle announced in this type of structure wherein particulate matter in suspension is controlled so that once it has contributed to the measurement being taken it is at once removed from the system so that spurious or inaccurate data is completely avoided, and has been shown to be applicable to the technique described in the earlier Coulter patents for counting and/or sizing either in batch or flow-through arrangements.

It is believed the invention has been set forth in full and complete detail and has been fully described as to its applications. Minor variations in the structure, such as locating the chamber 34 entirely within the chamber 32, or without the intervening passages 36 and 46, and other variations in the arrangements and size of the various parts may occur to those skilled in the art without departing from the spirit or circumventing the scope of the invention as set forth in the appended claims.

What is claimed is:

1. In a particle measuring apparatus including a container of liquid suspension to be tested, an aperture tube extending into said container, a vacuum source for moving the liquid from the container into and through the aperture tube, means establishing an electrical field between said container and the aperture tube, and a detector, the improvement comprising the aperture tube having first and second chambers, an aperture in the first chamber in communication with the liquid suspension in the container, a conduit extending from the second chamber into the first chamber and having one open end terminating at a point closely spaced from and directly opposite the interior of said aperture, means connecting said second chamber to said vacuum source and means to initially fill both the first and second chambers with the liquid suspension, and said means establishing an electrical field including a first electrode in said container and a second electrode in said aperture tube, whereby the suspension will flow from the container through the aperture and into said conduit and then into said second chamber.

2. The structure as defined in claim 1 wherein said aperture and said conduit one open end have cross-sectional areas which are microscopic in dimension, but said conduit one open end being of larger dimension than said aperture.

3. The structure as defined in claim 1 and further including valve means adapted to interconnect said first chamber with said vacuum source and to disconnect said second chamber from said vacuum source and to connect said second chamber with a reservoir of the liquid suspension to enable flushing of said aperture tube.

References Cited by the Examiner

UNITED STATES PATENTS

| | | | |
|---|---|---|---|
| 2,492,768 | 12/1949 | Schaefer | 324—71 |
| 2,830,945 | 4/1958 | Keidel | 324—30 X |
| 2,869,078 | 1/1959 | Coulter et al. | 324—71 |
| 2,996,917 | 8/1961 | Christoph | 73—355 |
| 3,208,926 | 9/1965 | Eckfeldt | 324—30 X |

WALTER L. CARLSON, *Primary Examiner.*

RUDOLPH V. ROLINEC, *Examiner.*

C. A. S. HAMRICK, C. F. ROBERTS,
*Assistant Examiners.*